(12) United States Patent
Voorheis

(10) Patent No.: US 7,888,432 B2
(45) Date of Patent: *Feb. 15, 2011

(54) HIGH COR GOLF BALL USING ZINC DIMETHACRYLATE

(75) Inventor: Peter R. Voorheis, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/073,088

(22) Filed: Feb. 29, 2008

(65) Prior Publication Data

US 2008/0214739 A1    Sep. 4, 2008

Related U.S. Application Data

(63) Continuation of application No. 10/740,530, filed on Dec. 22, 2003, now Pat. No. 7,342,073.

(51) Int. Cl.
A63B 37/00 (2006.01)
A63B 37/12 (2006.01)
C08F 279/02 (2006.01)

(52) U.S. Cl. .................. 525/261; 525/274; 473/373; 473/376

(58) Field of Classification Search .............. None
See application file for complete search history.

(56) References Cited

U.S. PATENT DOCUMENTS

| | | | |
|---|---|---|---|
| 4,560,168 A | 12/1985 | Aoyama | 273/232 |
| 4,925,193 A | 5/1990 | Melvin et al. | 273/232 |
| 4,960,281 A | 10/1990 | Aoyama | 273/232 |
| 5,006,297 A | 4/1991 | Brown et al. | 264/234 |
| 5,248,878 A | 9/1993 | Ihara | 219/121.69 |
| 5,249,804 A | 10/1993 | Sanchez | 273/232 |
| 5,252,652 A | 10/1993 | Egashira et al. | 524/392 |
| 5,334,673 A | 8/1994 | Wu | 273/235 R |
| 5,484,870 A | 1/1996 | Wu | 528/28 |
| 5,562,552 A | 10/1996 | Thurman | 473/379 |
| 5,575,477 A | 11/1996 | Hwang | 473/379 |
| 5,605,968 A | 2/1997 | Egashira et al. | 525/221 |
| 5,688,191 A | 11/1997 | Cavallaro et al. | 473/373 |
| 5,697,856 A | 12/1997 | Moriyama et al. | 473/374 |
| 5,713,801 A | 2/1998 | Aoyama | 473/354 |
| 5,733,428 A | 3/1998 | Calabria et al. | 264/134 |
| 5,776,012 A | 7/1998 | Moriyama et al. | 473/372 |
| 5,803,831 A | 9/1998 | Sullivan et al. | 473/374 |
| 5,816,944 A | 10/1998 | Asakura et al. | 473/372 |
| 5,820,488 A | 10/1998 | Sullivan et al. | 473/374 |
| 5,849,168 A | 12/1998 | Lutz | 264/755 |
| 5,885,172 A | 3/1999 | Hebert et al. | 473/354 |
| 5,919,100 A | 7/1999 | Boehm et al. | 473/354 |
| 5,919,101 A | 7/1999 | Yokota et al. | 473/374 |
| 5,929,171 A | 7/1999 | Sano et al. | 525/261 |
| 5,957,787 A | 9/1999 | Hwang | 473/379 |
| 5,965,669 A | 10/1999 | Cavallaro et al. | 525/221 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,075,223 A | 6/2000 | Harrison | 219/121.85 |
| 6,121,357 A | 9/2000 | Yokota | 524/406 |
| 6,129,881 A | 10/2000 | Puniello | 264/278 |
| 6,149,535 A | 11/2000 | Bissonnette et al. | 473/354 |
| 6,162,135 A | 12/2000 | Bulpett et al. | 473/373 |
| 6,180,040 B1 | 1/2001 | Ladd et al. | 264/248 |
| 6,180,722 B1 | 1/2001 | Dalton et al. | 525/193 |
| 6,184,301 B1 | 2/2001 | Shindo et al. | 525/261 |
| 6,207,784 B1 | 3/2001 | Rajagopalan | 528/71 |
| 6,213,898 B1 | 4/2001 | Ogg | 473/383 |
| 6,235,230 B1 | 5/2001 | Puniello | 264/278 |
| 6,241,625 B1 | 6/2001 | Yokota et al. | 473/373 |
| 6,287,218 B1 | 9/2001 | Ohama | 473/377 |
| 6,290,615 B1 | 9/2001 | Ogg | 473/378 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,379,138 B1 | 4/2002 | Puniello et al. | 425/116 |
| 6,383,092 B1 | 5/2002 | Ogg | 473/378 |
| 6,386,993 B1 | 5/2002 | Yokota | 473/373 |
| 6,409,615 B1 | 6/2002 | McGuire et al. | 473/383 |
| 6,462,303 B1 | 10/2002 | Brown | 219/121.69 |

(Continued)

FOREIGN PATENT DOCUMENTS

JP    10192446    7/1998

OTHER PUBLICATIONS

Thain, Science and Golf IV; p. 319-327.

*Primary Examiner*—David Buttner
(74) *Attorney, Agent, or Firm*—Murphy & King, P.C.

(57) ABSTRACT

The present invention is directed to resilient golf balls and portions thereof including compositions containing zinc dimethacrylate and zinc pentachlorothiophenol, and methods for making same. In particular, the present invention is directed to a golf ball having at least one of a center, cover, or intermediate layer that includes a reaction product that includes a resilient polymer component, a free radical source, zinc dimethacrylate and at least one halogenated organosulfur compound having the following general formula I:

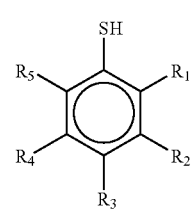

where $R_1$-$R_5$ can be substituted or unsubstituted $C_1$-$C_8$ alkyl groups; halogen groups; thiol groups (—SH), carboxylated groups; sulfonated groups; and hydrogen; in any order.

17 Claims, 1 Drawing Sheet

U.S. PATENT DOCUMENTS

| | | | |
|---|---|---|---|
| 6,582,326 B2 | 6/2003 | Wu et al. | 473/378 |
| 6,629,898 B2 | 10/2003 | Nardacci | 473/373 |
| 6,635,716 B2 | 10/2003 | Voorheis et al. | 525/261 |
| 6,653,402 B2 | 11/2003 | Ichikawa et al. | 525/71 |
| 6,705,959 B2 | 3/2004 | Morgan et al. | 473/383 |
| 6,796,912 B2 | 9/2004 | Dalton et al. | 473/383 |
| 6,800,690 B2 | 10/2004 | Rajagopalan et al. | 525/183 |
| 6,818,705 B2 | 11/2004 | Wu et al. | 525/261 |
| 6,818,724 B2 | 11/2004 | Wu et al. | 528/63 |
| 6,835,794 B2 | 12/2004 | Wu et al. | 528/64 |
| 6,877,974 B2 | 4/2005 | Puniello et al. | 425/116 |
| 6,899,640 B2 | 5/2005 | Sasaki et al. | 473/371 |
| 6,935,240 B2 | 8/2005 | Gosetti | 101/491 |
| 6,960,629 B2 | 11/2005 | Voorheis et al. | 525/256 |
| 6,998,444 B2 | 2/2006 | Voorheis et al. | 525/256 |
| 7,342,073 B2 * | 3/2008 | Voorheis | 525/261 |
| 7,427,243 B2 | 9/2008 | Sullivan | 473/378 |
| 2001/0009310 A1 | 7/2001 | Hebert et al. | |
| 2001/0018375 A1 | 8/2001 | Hayashi et al. | |
| 2001/0019971 A1 | 9/2001 | Hayashi et al. | |
| 2002/0025862 A1 | 2/2002 | Sullivan et al. | |
| 2002/0028885 A1 | 3/2002 | Sullivan et al. | |
| 2002/0032077 A1 | 3/2002 | Watanabe | |
| 2002/0055400 A1 | 5/2002 | Higuchi et al. | |
| 2002/0082358 A1 | 6/2002 | Ohira et al. | |
| 2002/0098915 A1 | 7/2002 | Cavallaro et al. | |
| 2003/0100383 A1 | 5/2003 | Jordan | |
| 2003/0100386 A1 | 5/2003 | Jordan | |

* cited by examiner

HIGH COR GOLF BALL USING ZINC DIMETHACRYLATE

CROSS-REFERENCE TO RELATED APPLICATIONS

This application is a continuation of U.S. patent application Ser. No. 10/740,530, filed Dec. 22, 2003, now U.S. Pat. No. 7,342,073, the disclosure of which is incorporated by reference herein in its entirety.

FIELD OF THE INVENTION

The present invention relates to the use of zinc dimethacrylate in golf ball compositions. In particular, the invention relates to resilient golf balls and portions thereof including compositions containing zinc dimethacrylate and zinc pentachlorothiophenol, and methods for making same.

BACKGROUND OF THE INVENTION

Conventional golf balls can be divided into several general classes: (a) solid golf balls having one or more layers, and (b) wound golf balls. Solid golf balls include one-piece balls, which are easy to construct and relatively inexpensive, but have poor playing characteristics and are thus generally limited for use as range balls. Two-piece balls are constructed with a generally solid core and a cover and are generally popular with recreational golfers because they are very durable and provide maximum distance. Balls having a two-piece construction are commonly formed of a polymeric core encased by a cover. Solid golf balls also include multi-layer golf balls that are comprised of a solid core of one or more layers and/or a cover of one or more layers. These balls are regarded as having an extended range of playing characteristics. These balls are generally easy to manufacture, but are regarded as having limited playing characteristics.

A variety of golf balls designed to provide a wide range of playing characteristics, i.e., the compression, velocity, "feel," and spin, that can be optimized for various playing ability, are known in the prior art. Typical golf ball construction includes a core formed from polybutadiene that is chemically crosslinked with zinc diacrylate and/or other similar crosslinking agents.

However, it is desirable to have golf ball compositions that alternative crosslinkers, such as zinc dimethacrylate, without compromising golf ball playability. The compositions of the present invention provided golf balls with improved coefficient of restitution ("CoR") and increased compression using zinc dimethacrylate.

SUMMARY OF THE INVENTION

The present invention is directed to a golf ball comprising at least one structural layer formed from a composition that comprises a resilient polymer component, a free radical source, zinc dimethacrylate and at least one halogenated organosulfur compound having the following general formula I:

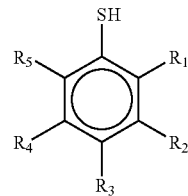

where $R_1$-$R_5$ can be substituted or unsubstituted $C_1$-$C_8$ alkyl groups; halogen groups; thiol groups (—SH), carboxylated groups; sulfonated groups; and hydrogen; in any order.

In one embodiment, the at least one structural layer is a core, an intermediate layer or a cover, wherein the composition is disposed in at least a portion of the at least one structural layer. The zinc dimethacrylate may be present in an amount from about 0.01 pph to about 100 pph and the at least one halogenated organosulfur compound of formula I is present in an amount from about 0.01 pph to about 50 pph.

In one embodiment, the at least one halogenated organosulfur compound of formula I is selected from the group consisting of pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; and their metal salts. In a preferred embodiment, the at least one halogenated organosulfur compound of formula I is a metal salt of Zn, Ca, Ba, Cd, Sn, Mg, and Mn. In another preferred embodiment, the at least one halogenated organosulfur compound of formula I is a metal salt of Zn. In yet another preferred embodiment, the at least one halogenated organosulfur compound of formula I is zinc pentachlorothiophenol.

The free radical source may be di-tert-amyl peroxide, di(2-tert-butylperoxyisopropyl)benzene peroxide or α,α-bis(tert-butylperoxy) diisopropylbenzene, 1,1-bis(tert-butylperoxy)-3,3,5-trimethylcyclohexane or 1,1-di(tert-butylperoxy) 3,3,5-trimethyl cyclohexane, dicumyl peroxide, di-tert-butyl peroxide, 2,5-di-(tert-butylperoxy)-2,5-dimethyl hexane, n-butyl-4,4-bis(tert-butylperoxy)valerate, lauryl peroxide, benzoyl peroxide, tert-butyl hydroperoxide, or any mixture thereof.

In one embodiment, the composition further comprises one or more additional crosslinking agent selected from the group consisting of a metallic salt of an unsaturated acid monomer and a metallic salt of a monocarboxylic acid. In another embodiment, the cover comprises one or more homopolymeric or copolymeric cover materials selected from the group consisting of thermoset polyurethane, thermoplastic polyurethane, thermoset polyurea, thermoplastic polyurea, thermoset elastomer, thermoplastic elastomer and thermoplastic ionomer.

In one embodiment, the golf ball core has an Atti compression of at least about 40 and a coefficient of restitution of at least about 0.78. In another embodiment, the golf ball has a ball spin rate of about 2500 rpm to about 4000 rpm when the golf ball is hit with a golf driver. In yet another embodiment, the golf ball has a ball spin rate of about 6,500 rpm to about 10,000 rpm when the golf ball is hit with an 8-iron.

In one embodiment, the flexural modulus of the intermediate layer is about 2000 psi to about 200,000 psi and the flexural modulus of the cover is from about 5000 psi to about 100,000 psi. In another embodiment, the core has a hardness of about 15 Shore A or greater, the intermediate layer has a hardness of about 30 Shore D or greater, and the cover has a hardness of 70 Shore D or less.

The resilient polymer component may be selected from the group consisting of a cis-polybutadiene, trans-polybutadiene, cis-polyisoprene, trans-polyisoprene, thermoplastic copolyesterester block copolymer; dynamically vulcanized thermoplastic elastomer; hydrogenated styrene-butadiene elastomer, non-hydrogenated styrene-butadiene elastomer; thermoplastic polyurethane; polymers made using a metallocene catalyst; ethylene propylenediene monomer; ethylene propylene rubber; or mixtures thereof. In one embodiment, the resilient polymer component comprises greater than 90% cis-polybutadiene. In still another embodiment, the resilient polymer component has a Mooney viscosity from about 30 to about 120.

The present invention is also directed to a golf ball comprising at least one structural layer formed from a composition that comprises a resilient polymer component, a free radical source, zinc dimethacrylate and zinc pentachlorothiophenol.

The present invention is also directed to a method of manufacturing golf balls comprising providing a core; optionally providing an intermediate layer disposed outside the core; and providing at least one cover over the core and optional intermediate layer, wherein at least one of the cover, the core, and the optional intermediate layer comprises at least one layer formed from a composition that comprises a resilient polymer component, a free radical source, zinc dimethacrylate and at least one halogenated organosulfur compound having the following general formula I:

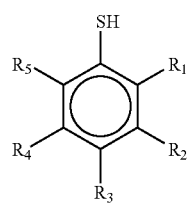

where $R_1$-$R_5$ can be substituted or unsubstituted $C_1$-$C_8$ alkyl groups; halogen groups; thiol groups (—SH), carboxylated groups; sulfonated groups; and hydrogen; in any order.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
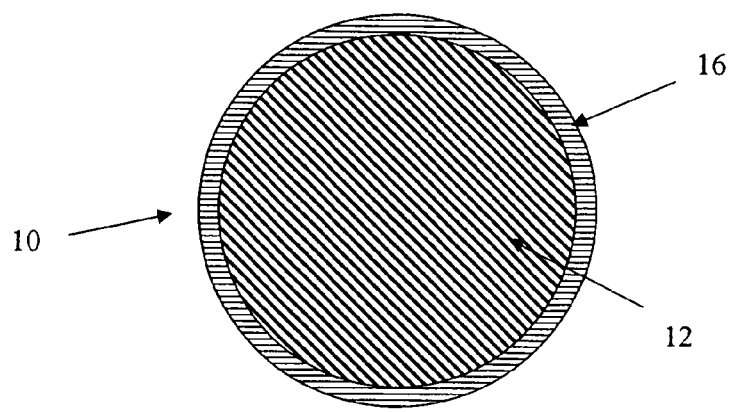
FIG. 1 is a cross-sectional view of a two-piece golf ball having a cover and a core according to the invention.

The present invention relates to one-piece golf balls, two-piece golf balls, or multilayer golf balls having a center, at least one intermediate layer disposed concentrically adjacent to the center, and a cover. The invention also relates to golf balls having a double core, a multi-layer core, a double cover, a multi-layer cover or more than one intermediate layer. At least one portion of the golf ball, i.e., one of the center, cover(s), or intermediate layer(s), includes a composition comprising zinc dimethacrylate ("ZDMA") and at least one halogenated organosulfur compound having the following general formula I:

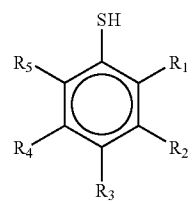

where $R_1$-$R_5$ can be substituted or unsubstituted $C_1$-$C_8$ alkyl groups; halogen groups; thiol groups (—SH); carboxylated groups; sulfonated groups; and hydrogen; in any order.

More particularly, at least one portion of the golf ball includes a composition comprising a resilient polymer component; ZDMA; at least one halogenated organosulfur compound of formula I and optionally a free radical source. Without wishing to be bound by any theory, ZDMA functions as, inter alia, a crosslinker and the at least one halogenated organosulfur compound of formula I functions as, inter alia, a vulcanization accelerator.

Typically, the addition of ZnPCTP to zinc diacrylate ("ZDA") compositions increases the TC90, lowers golf ball compression, and provides a modest increase in the coefficient of restitution ("CoR," as defined below) at 125 feet per second, when compared to ZDA compositions with no ZnPCTP. In the present invention, the addition of at least one of a halogenated organosulfur compound of formula I to ZDMA compositions surprisingly increases golf ball compression, lowers the TC90, and provides significant increases in the CoR at 125 feet per second. The compositions of the present invention also provides golf balls having respectable CoR at 125 feet per second.

In one embodiment, ZDMA is present in an amount greater than about 10 pph of the base polymer, preferably from about 0.01 pph to about 100 pph, more preferably from about 1 pph to about 60 pph. As used herein, the term "parts per hundred", also known as "pph", is defined as the number of parts by weight of a particular component present in a mixture, relative to 100 parts by weight of the total polymer component, which includes the resilient polymer component and any other polymer component. Mathematically, this can be expressed as the weight of an ingredient divided by the total weight of the polymer, multiplied by a factor of 100. In another embodiment, ZDMA is present from about 5 pph to about 50 pph of base polymer, preferably from about 10 pph to about 35 pph of base polymer, more preferably from about 15 to about 25 pph of base polymer.

Preferred halogenated organosulfur compounds having general formula I include, but are not limited to, pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol and; and their salts with Zn, Cd, Sn, Mg, and Mn.

Preferably, the halogenated organosulfur compound is pentachlorothiophenol ("PCTP"), which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol ("Zn-PCTP"), which is commercially available from eChinachem of San Francisco, Calif.

As used herein, the term "substituted or unsubstituted $C_1$-$C_8$ alkyl" means any substituted or unsubstituted acyclic carbon-containing groups having from one to eight carbon atoms. Examples of substituted or unsubstituted $C_1$-$C_8$ alkyl groups include methyl, ethyl, propyl, butyl, pentyl, hexyl, and isomers thereof, including, for example, iso-propyl, iso-propyl, n-butyl, iso-butyl, sec-butyl, tert-butyl, iso-pentyl, neopentyl, hexyl, heptyl, octyl, and the like). One of ordinary skill in the art is familiar with the various configurations of linear and branched alkyl groups, which are within the scope of the present invention.

As used herein, the term "substituted" means groups that also contain various substituents in which one or more hydrogen atoms is replaced by a functional group (e.g., a substituted alkyl group having one or more functional groups) or alkyl group as defined in the above. Functional groups include, but are not limited to, hydroxyl, amino (e.g., $R_1R_2N$, wherein $R_1$ and $R_2$ are each independently hydrogen, alkyl, aryl or cycloalkyl), alkoxy, carboxyl (e.g., ester, acid, and metal derivatives thereof), sulfoxidyl, sulfonyl, sulfonoyl, amido, phosphate, thiol, cyano, nitro, silyl and halogen (e.g., fluoro, chloro, bromo or iodo).

In one embodiment, the halogenated organosulfur compound of formula I is present in an amount from about 0.01 pph to about 50 pph, preferably from about 0.1 pph to about 20 pph. In another embodiment, the halogenated organosulfur compound of formula I is present in an amount from about 1 pph to about 5 pph, preferably from about 2 pph to about 3 pph. The upper and lower limits of the ranges disclosed herein are interchangeable to form new ranges. For example, the amount of the halogenated organosulfur compound of formula I may be present from about 0.1 pph to about 5 pph, from about 1 pph to about 3 pph, and even 5 pph to about 20 pph.

The compositions of the present invention may be used with any type of ball construction. For example, the ball may have a one-piece, two-piece, or three-piece design, a multi-layer core, a multi-layer cover, one or more intermediate layers. As used herein, the term "multi-layer" means at least two layers, i.e., at least two structural layers. For example, the compositions of the invention may be used in a core, intermediate layer, and/or cover of a golf ball, each of which may have a single layer or multiple layers. Thus, the invention encompasses golf balls having at least one layer formed from a composition that comprises ZDMA and at least one halogenated organosulfur compound of formula I. As used herein, the term "layer" includes any generally spherical portion of a golf ball, i.e., a golf ball core or center, an intermediate layer, and or a golf ball cover.

Thus, in one embodiment, a golf ball core comprises ZDMA and one or more halogenated organosulfur compounds of formula I. In another embodiment, a golf ball having more than one layer in the core comprises ZDMA and one or more halogenated organosulfur compounds of formula I in at least one of the core layers.

In another embodiment, a golf ball intermediate layer comprises ZDMA and one or more halogenated organosulfur compounds of formula I. In another embodiment, a golf ball having more than one intermediate layer comprises ZDMA and one or more halogenated organosulfur compounds of formula I in at least one of the intermediate layers.

In yet another embodiment, a golf ball cover comprises ZDMA and one or more halogenated organosulfur compounds of formula I. In another embodiment, a golf ball having more than one cover comprises ZDMA and one or more halogenated organosulfur compounds of formula I in at least one of the cover layers.

Figure 2:
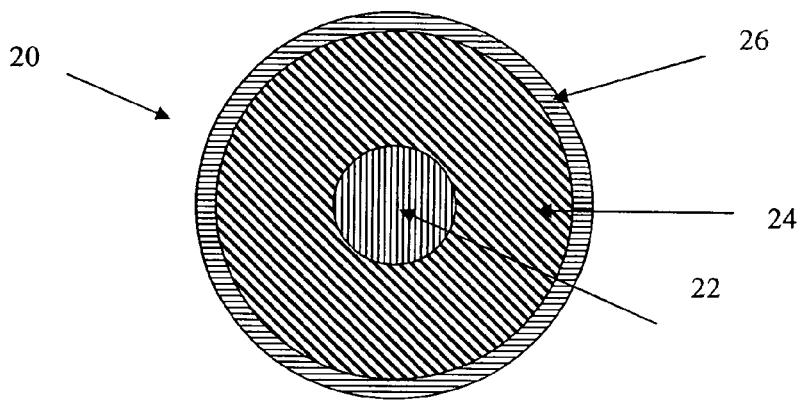
FIG. 2 is a cross-section of a golf ball having an intermediate layer between a cover and a center according to the invention.
Figure 3:
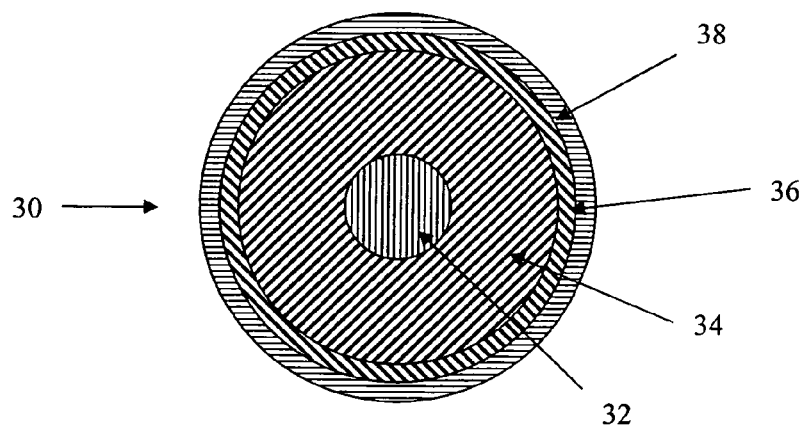
FIG. 3 is a cross section of a golf ball having more than one intermediate layer between a cover and a center according to the invention.

For example, FIG. 1 illustrates a golf ball according to the invention with a one-piece core. Golf ball 10 of the present invention can include a core 12 and a cover 16 surrounding the core 12, wherein at least one of core 12 and cover 16 incorporates at least one layer comprising ZDMA and one or more halogenated organosulfur compounds of formula I. Similarly, FIG. 2 illustrates a multi-layer golf ball 20 that include a center 22, a cover 26, and at least one intermediate layer 24 disposed between the cover and the center. Each of the cover and center may also include more than one layer; i.e., the golf ball can be a conventional three-piece wound ball, a two-piece ball, a ball having a multi-layer core or an intermediate layer or layers, etc. Thus, referring to FIG. 3, a golf ball 30 of the present invention can include a center 32, a cover 38, and intermediate layers 34 and 36 disposed between the cover and the center. Although FIG. 3 shows only two intermediate layers, it will be appreciated that any number or type of intermediate layers may be used, as desired.

Resilient Polymer Component

The resilient polymer component includes natural or synthetic rubbers, as well as any combination thereof. Particular resilient polymer components include, but are not limited to, polybutadiene, including cis-polybutadiene, trans-polybutadiene, or mixtures thereof; isoprene, including cis-polyisoprene, trans-polyisoprene, or mixtures thereof; thermoplastic copolyesterester block copolymer; dynamically vulcanized thermoplastic elastomer; hydrogenated or non-hydrogenated styrene-butadiene elastomer; thermoplastic polyurethane; polymers made using a metallocene catalyst; ethylene propylenediene monomer; ethylene propylene rubber; or mixtures thereof. In one embodiment, the resilient polymer component is 1,4-polybutadiene having a cis-structure of at least about 40 percent, of which natural rubber, polyisoprene rubber and/or styrene-butadiene rubber may be thereto. In another embodiment, the resilient polymer component is 1,4-polybutadiene having a cis-structure of at least about 85% percent, preferably 90% and more preferably 95%. In yet another embodiment, the resilient polymer component is from about 95% to about 99% cis-polybutadiene.

In one embodiment, the resilient polymer component has a Mooney viscosity greater than about 20, preferably greater than about 30, and more preferably greater than about 40. Mooney viscosity is typically measured according to ASTM D-1646. In another embodiment, the Mooney viscosity of the polybutadiene is greater than about 35, and preferably greater than about 50. In one embodiment, the Mooney viscosity of the polybutadiene is from about 40 to about 120. In yet another embodiment, the Mooney viscosity of the polybutadiene is from about 45 to about 60, more preferably from about 45 to about 55. As previously mentioned, the upper and lower limits of the ranges disclosed herein are interchangeable to form new ranges. For example, the Mooney viscosity of polybutadiene may also be from about 45 to about 55, from about 40 to about 45, and from about 55 to about 120.

Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, and BR1220, commercially available from Dow Chemicals of Midland, Mich. If desired, the polybutadiene can also be mixed with other elastomers known in the art such as natural rubber, polyisoprene rubber and/or styrene-butadiene rubber in order to modify the properties of the core.

Suitable thermoplastic copolyetheresters include HYTREL® 3078 and HYTREL® 4069, which are commercially available from E. I. DuPont de Nemours & Co. of Wilmington, Del. Suitable dynamically vulcanized thermoplastic elastomers include SANTOPRENE®, commercially available from Advanced Elastomer Systems of Akron, Ohio. Examples of suitable functionalized styrene-butadiene elastomers, include KRATON FG-1901x and FG-1921x, which are available from the Shell Corporation of Houston, Tex. Examples of suitable thermoplastic polyurethanes include ESTANE® 58133 and ESTANE® 58144, which are commercially available from the B.F. Goodrich Company of Cleveland, Ohio. Further, the materials for the intermediate layer described below may be in the form of a foamed polymeric material. For example, suitable metallocene polymers include foams of thermoplastic elastomers based on metallocene single-site catalyst-based foams. Suitable thermoplastic polyetheramides include PEBAX® 2533, PEBAX® 1205 and PEBAX® 4033 which are available from Atofina of King of Prussia, Pa. Suitable thermoplastic ionomer resins include any number of olefinic based ionomers including SURLYN® and IOTEK®, which are commercially available from E. I. DuPont de Nemours & Co. of Wilmington, Del., and Exxon Corporation of Irving, Tex., respectively. When the resilient polymer component includes any polymers in addition to polybutadiene, polybutadiene will be present in at least 50 pph of the resilient polymer component, preferably in an amount greater than about 75 pph, and more preferably in an amount greater than about 90 pph.

Free Radical Source

The free-radical source is typically a peroxide, and preferably an organic peroxide, which decomposes during the cure cycle. Suitable free-radical sources include organic peroxide compounds, such as di-tert-amyl peroxide, di(2-tert-butylperoxyisopropyl)benzene peroxide or α,α-bis(tert-butylperoxy) diisopropylbenzene, 1,1-bis(tert-butylperoxy)-3,3,5-trimethylcyclohexane or 1,1-di(tert-butylperoxy) 3,3,5-trimethyl cyclohexane, dicumyl peroxide, di-tert-butyl peroxide, 2,5-di-(tert-butylperoxy)-2,5-dimethyl hexane, n-butyl-4,4-bis(tert-butylperoxy)valerate, lauryl peroxide, benzoyl peroxide, tert-butyl hydroperoxide, and the like, and any mixture thereof.

Other examples include, but are not limited to, VAROX® 231XL and VAROX® DCP-R, commercially available from Atofina Chemicals, Inc. of King of Prussia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

The peroxide may be present in an amount greater than about 0.1 pph of the total resilient polymer component, preferably about 0.1 pph to about 15 pph of the resilient polymer component.

Other Ingredients

Other materials conventionally included in golf ball compositions may also be added to the compositions of the invention. These additional materials include, but are not limited to, density-adjusting fillers, reaction enhancers, crosslinking agents, optical brighteners, coloring agents, fluorescent agents, whitening agents, UV absorbers, hindered amine light stabilizers, defoaming agents, processing aids, mica, talc, nano-fillers, and other conventional additives. Antioxidants, stabilizers, softening agents, plasticizers, including internal and external plasticizers, impact modifiers, foaming agents, excipients, reinforcing materials and compatibilizers may also be added to any composition of the invention. In addition, heat stabilizers may be beneficial in enlarging the range of processing temperatures to greater than about 130° C. All of these materials, which are well known in the art, are added for their usual purpose in typical amounts.

Crosslinkers (i.e., crosslinking agents) in addition to ZDMA may be included to increase the hardness of the reaction product. Suitable additional crosslinking agents include one or more metallic salts of unsaturated acid monomers or unsaturated fatty acids having 3 to 8 carbon atoms, such as acrylic or methacrylic acid, or monocarboxylic acids, including zinc, calcium, or magnesium acrylate salts, and the like, and mixtures thereof. Exemplary additional crosslinkers include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, and mixtures thereof. Crosslinkers also include organic acids having more than one carboxylic acid groups, including diacids, triacids and tetraacids.

The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to one of ordinary skill in the art. It is known that the use of crosslinkers increase the compression of golf balls.

The additional crosslinking agent may be present in an amount greater than about 0.1 percent of the polymer component, preferably from about 5 to 40 percent of the resilient polymer component, more preferably from about 10 to 25 percent of the resilient polymer component.

In one embodiment, the additional crosslinking agent is present in an amount greater than about 10 pph of the base polymer, preferably from about 20 pph to about 40 pph of the base polymer, more preferably from about 25 pph to about 35 pph of the base polymer. The additional crosslinking agents can be in pure form, i.e., in 100% active form, or dispersed in a suitable carrier known to one of ordinary skill in the art.

In other embodiments, the golf ball further comprises a cis-to-trans catalyst, such as those described in copending U.S. application Ser. Nos. 10/437,386 and 10/437,387, the entirety of which are incorporated herein by reference. Without being bound by any particular theory, it is believed that the cis-to-trans catalyst component, in conjunction with a free radical source, acts to convert a percentage of the polybutadiene from the cis- to the trans-conformation. As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component (including metal-containing and nonmetal-containing organosulfur compounds), a Group VIA component, an inorganic sulfide, a substituted or unsubstituted aromatic organic compound that does not contain sulfur or metal, an aromatic organometallic compound, or any combination thereof. In one embodiment, the cis-to-trans catalyst is a blend of an organosulfur component and an inorganic sulfide component or a Group VIA component. In another embodiment, the cis-to-trans catalyst is a blend of an organosulfur component, an inorganic sulfide component, and a Group VIA component. In one embodiment, the halogenated organosulfur compound of formula I catalyzes the cis-to-trans transformation of polybutadiene.

When elemental sulfur or polymeric sulfur is included in the cis-to-trans catalyst, an accelerator may be used to improve the performance of the cis-to-trans catalyst and increase the trans-conversion for a given amount of sulfur catalyst. Suitable accelerators include, but are not limited to, sulfenamide, such as N-oxydiethylene 2-benzothiazolesulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

The cis-to-trans catalyst is typically present in an amount sufficient to produce a reaction product so as to increase the trans-polybutadiene isomer content to contain from about 5 percent to 70 percent trans-isomer polybutadiene based on the total resilient polymer component. The cis-to-trans catalyst is preferably present in an amount from about 0.1 pph to 25 pph of the total amount of polybutadiene.

Core

The invention encompasses the use of ZDMA and one or more halogenated organosulfur compounds of formula I in a one-piece core or a multi-layer core. As used herein, the term "core" means the innermost portion of a golf ball, and may include one or more layers. When a multi-layer core is contemplated, the core is the innermost component with one or more additional core layers disposed thereon. The present invention encompasses compositions that could lead to better aging cores, as well as more durable cores. In one embodiment, the one or more additional core layers are solid and includes a reinforcing polymer component as described herein to improve the centering of the layers within the ball.

At least a portion of the core, typically the center, is solid, semi-solid, hollow, powder-filled or fluid-filled. As used herein, the term "fluid" means a gas, liquid, gel, paste, or the like, or a combination thereof. Any core material known to one of ordinary skill in the art also is suitable for use in the golf balls of the present invention.

In one embodiment, the core comprises ZDMA and one or more halogenated organosulfur compounds of formula I. The core may also include conventional materials, for example, a resilient polymer component, a free radical source, an additional crosslinking agent, and a density adjusting filler. Additional crosslinking agents include metal salts of unsaturated fatty acids, such as zinc or magnesium salts of acrylic or methacrylic acid. The density adjusting filler typically includes materials such as zinc oxide, barium sulfate, silica, calcium carbonate, zinc carbonate and the like, as well as foaming agents.

In one embodiment, the center composition comprises ZDMA and at least one halogenated organosulfur compound of formula I, and a resilient polymer component having a resilience index of at least about 40. In another embodiment, the resilience index of the resilient polymer component is at least about 50.

The ZDMA, at least one halogenated organosulfur compound of formula I, resilient polymer component, free-radical initiator, filler(s), and any other materials used in forming either the golf ball center or any portion of the core, in accordance with invention, may be combined to form a polymer mixture by any type of mixing known to one of ordinary skill in the art.

The compression of the core, or portion of the core, of golf balls prepared according to the invention is typically below 100, preferably below about 90, more preferably below about 80. In one embodiment, the compression of the core, or portion of the core, of golf balls is from about 25 to about 100. In another embodiment, the compression of the core, or portion of the core, of golf balls is from about 50 to about 95. In yet another embodiment, the compression of the core, or portion of the core, of golf balls is from about 75 to about 90.

The compositions of the present invention preferably has a hardness of at least about 15 Shore A, more preferably between about 30 Shore A and 80 Shore D, and even more preferably between about 50 Shore A and 60 Shore D. In addition, the specific gravity is typically greater than about 0.7, preferably greater than about 1, for the golf ball polybutadiene material. Moreover, the reaction product preferably has a flexural modulus of from about 500 psi to about 300,000 psi, preferably from about 1,000 to about 250,000, and more preferably from about 2,000 to about 200,000 psi.

Although the compositions discussed herein relate to core compositions, the invention also encompasses the use of such compositions to form at least a portion of any component of a golf ball, including the cover(s) and intermediate layer(s).

Fillers added to one or more portions of the golf ball typically include processing aids or compounds to affect rheological and mixing properties, the specific gravity (i.e., density-modifying fillers), the modulus, the tear strength, reinforcement, and the like. The fillers are generally inorganic, and suitable fillers include numerous metals (including metal powders) or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Foamed polymer blends may be formed by blending ceramic or glass microspheres with polymer material. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Intermediate Layer

An "intermediate layer" (also known as inner layer or mantle layer) is defined herein as a portion of the golf ball that occupies a volume between the cover and the core. Such an intermediate layer may be distinguished from a cover or a core by some difference between the golf ball layers, e.g., hardness, compression, thickness, and the like. An intermediate layer may be used, if desired, with a multilayer cover or a multilayer core, or with both a multilayer cover and a multilayer core. Accordingly, an intermediate layer is also sometimes referred to in the art as an inner cover layer, as an outer core layer or as a mantle layer, i.e., any layer(s) disposed between the inner core and the outer cover of a golf ball, this layer may be incorporated, for example, with a single layer or a multilayer cover, with a one-piece core or a multilayer core, with both a single layer cover and core, or with both a multilayer cover and a multilayer core. As with the core, the intermediate layer may also include a plurality of layers. It will be appreciated that any number or type of intermediate layers may be used, as desired.

When the golf ball of the present invention includes an intermediate layer, such as an inner cover layer or outer core layer, i.e., any layer(s) disposed between the inner core and the outer cover of a golf ball, the intermediate layer can include at least one layer that comprises a composition that includes a resilient polymer component; a free radical source; ZDMA, and at least one halogenated organosulfur compound of formula I, as described hereinabove. In another embodiment, the intermediate layer can further include any materials known to one of ordinary skill in the art including thermoplastic and thermosetting materials.

The intermediate layer also likewise may include one or more homopolymeric or copolymeric materials, such as vinyl resins, polyolefins, polyurethanes, and polyureas, such as the ones disclosed in U.S. Pat. Nos. 5,334,673, and 5,484,870, polyamides, acrylic resins, thermoplastics, polyphenylene oxide resins, thermoplastic polyesters, blends and alloys, blends of thermoplastic rubbers, such as those disclosed in U.S. Pat. No. 6,162,135, the entirety of which is incorporated herein by reference.

In another embodiment, the intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof.

An intermediate layer may include ionomeric materials, such as ionic copolymers of ethylene and an unsaturated monocarboxylic acid, which are available under the trademark SURLYN® of E.I. DuPont de Nemours & Co., of Wilmington, Del., or IOTEK® or ESCOR® of Exxon.

The intermediate layer may also include at least one ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. The ionomer also may include so-called "low acid" and "high acid" ionomers, as well as blends thereof, such as those disclosed in copending U.S. application Ser. Nos. 10/437,386 and 10/437,387, the entirety of which is incorporated herein by reference. In general, ionic copolymers including up to about 15 percent acid are considered "low acid" ionomers, while those including greater than about 15 percent acid are considered "high acid" ionomers.

In one embodiment, the intermediate layer may be formed from at least one polymer containing $\alpha,\beta$-unsaturated carboxylic acid groups, or the salts thereof, that have been 100 percent neutralized by organic fatty acids, such as those disclosed in copending U.S. application Ser. Nos. 10/437,386 and 10/437,387, the entirety of which is incorporated-herein by reference.

In another embodiment, the intermediate layer may also be formed from highly neutralized polymers, such as those disclosed U.S. Patent Publication No. 2001/0018375 and 2001/0019971, the entirety of which are incorporated herein by reference; and/or grafted and non-grafted metallocene catalyzed polyolefins and polyamides, polyamide/ionomer blends, and polyamide/nonionomer blends, such as those disclosed in U.S. patent application Ser. No. 10/138,304, filed May 6, 2002, entitled "Golf Ball Incorporating Grafted Metallocene Catalyzed Polymer Blends," which is incorporated by reference herein in its entirety; among other polymers. Examples of other suitable intermediate layer materials include blends of some of the above materials, such as those disclosed in U.S. Pat. No. 5,688,181, the entire disclosure of which is incorporated by reference herein.

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof.

The intermediate layer may include a resilient polymer component, which is preferably used as the majority polymer in the intermediate layer to impart resilience in the cured state, and a reinforcing polymer component as a blend. Examples of such materials are disclosed hereinabove.

The resilient polymer component, reinforcing polymer component, free-radical initiator, and any other materials used in forming an intermediate layer of a golf ball core in accordance with invention may be combined by any type of mixing known to one of ordinary skill in the art.

The intermediate layer may also be formed from the compositions as disclosed in U.S. Pat. No. 5,688,191, the entire disclosure of which is incorporated by reference herein.

The intermediate layer may also be a tensioned elastomeric material wound around a solid, semi-solid, hollow, fluid-filled, or powder-filled center. A wound layer may be described as a core layer or an intermediate layer for the purposes of the invention. As an example, the golf ball may include a core layer, a tensioned elastomeric layer wound thereon, and a cover layer. In particular, the golf ball may have a core made of a composition containing ZDMA and at least one halogenated organosulfur compound of formula I, an intermediate layer including a tensioned elastomeric material and a cover. The tensioned elastomeric material may be formed of any suitable material known to one of ordinary skill in the art.

In one embodiment, the tensioned elastomeric material incorporates the reaction product discussed above. The tensioned elastomeric material may also be formed conventional polyisoprene.

In one embodiment, the tensioned elastomeric layer is a high tensile filament having a tensile modulus of about 10,000 kpsi or greater, as disclosed in co-pending U.S. patent application Ser. No. 09/842,829, filed Apr. 27, 2001, entitled "All Rubber Golf Ball with Hoop-Stress Layer," the entire disclosure of which is incorporated by reference herein. In another embodiment, the tensioned elastomeric layer is coated with a binding material that will adhere to the core and itself when activated, causing the strands of the tensioned elastomeric layer to swell and increase the cross-sectional area of the layer by at least about 5 percent. An example of such a golf ball construction is provided in co-pending U.S. patent application Ser. No. 09/841,910, the entire disclosure of which is incorporated by reference herein.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are disclosed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In one embodiment of the present invention, the interstitial material may extend from the intermediate layer into the core. In an alternative embodiment, the interstitial material can also be embedded in the cover, or be in contact with the inner surface of the cover, or be embedded only in the cover.

At least one intermediate layer may also be a moisture barrier layer, such as the ones described in U.S. Pat. No. 5,820,488, which is incorporated by reference herein. Any suitable film-forming material having a lower water vapor transmission rate than the other layers between the core and the outer surface of the ball, i.e., cover, primer, and clear coat. Examples include, but are not limited to polyvinylidene chloride, vermiculite, and a reaction product with fluorine gas. In one embodiment, the moisture barrier layer has a water vapor transmission rate that is sufficiently low to reduce the loss of CoR of the golf ball by at least 5 percent if the ball is stored at 100° F. and 70 percent relative humidity for six weeks as compared to the loss in CoR of a golf ball that does not include the moisture barrier, has the same type of core and cover, and is stored under substantially identical conditions.

Additional materials may be included in the intermediate layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the intermediate layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

Cover

The cover provides the interface between the ball and a club. Properties that are desirable for the cover are good moldability, high abrasion resistance, high tear strength, high resilience, and good mold release, among others.

As used herein, the term "cover" means the outermost portion of a golf ball. A cover typically includes at least one layer and may contain indentations such as dimples and/or ridges. Paints and/or laminates are typically disposed about the cover to protect the golf ball during use thereof.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge or plasma treatment prior to forming the cover around it. Other layers of the ball, e.g., the core, also may be surface treated. Examples of these and other surface treatment techniques can be found in U.S. Pat. No. 6,315,915, the entirety of which is incorporated by reference herein.

In one embodiment, the cover is formed from a composition that includes a resilient polymer component; a free radical source; ZDMA, and at least one halogenated organosulfur compound of formula I.

The cover may also likewise include one or more homopolymeric or copolymeric materials, such as vinyl resins, polyolefins, polyurethanes, and polyureas, such as the ones disclosed in U.S. Pat. Nos. 5,334,673, and 5,484,870, polyamides, acrylic resins, thermoplastics, polyphenylene oxide resins, thermoplastic polyesters, blends and alloys, blends of thermoplastic rubbers, such as those disclosed in U.S. Pat. No. 6,162,135, the entirety of which is incorporated herein by reference.

In one embodiment, the cover includes one or more homopolymeric or copolymeric cover materials, including but not limited to, thermoset polyurethane, thermoplastic polyurethane, thermoset polyurea, thermoplastic polyurea, thermoset elastomer, thermoplastic elastomer or thermoplastic ionomer. In another embodiment, the cover includes one or more homopolymeric or copolymeric cover materials that is light stable.

Preferably, the cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer.

In another embodiment, the cover material is formed from polyurea, which is disclosed in co-pending U.S. patent application Ser. Nos. 10/238,729, 10/256,011, 10/066,637 and 10/228,311, the entire disclosures of which are incorporated herein by reference.

In one embodiment, an intermediate cover layer may be formed from at least one polymer containing α,β-unsaturated carboxylic acid groups, or the salts thereof, that have been 100 percent neutralized by organic fatty acids. The organic acids are aliphatic, mono-functional (saturated, unsaturated, or multi-unsaturated) organic acids. Salts of these organic acids may also be used, including salts of barium, lithium, sodium, zinc, bismuth, chromium, cobalt, copper, potassium, strontium, titanium, tungsten, magnesium, cesium, iron, nickel, silver, aluminum, tin, or calcium; as well as salts of fatty acids, particularly stearic, behenic, erucic, oleic, or linoelic acids or dimerized derivatives thereof. It is preferred that the organic acids and salts of the present invention be relatively non-migratory (i.e., they do not bloom to the surface of the polymer under ambient temperatures) and non-volatile (they do not volatilize at temperatures required for melt-blending).

In another embodiment, the cover may also be formed from highly neutralized polymers, such as those disclosed U.S. Patent Publication No. 2001/0018375 and 2001/0019971, the entirety of which are incorporated herein by reference; and/or grafted and non-grafted metallocene catalyzed polyolefins and polyamides, polyamide/ionomer blends, and polyamide/nonionomer blends, such as those disclosed in U.S. patent application Ser. No. 10/138,304, filed May 6, 2002, entitled "Golf Ball Incorporating Grafted Metallocene Catalyzed Polymer Blends," which is incorporated by reference herein in its entirety; among other polymers.

The cover of the golf balls typically has a thickness of at least about 0.03 inches, preferably 0.03 to 0.125 inches, and more preferably from about 0.05 to 0.1 inches. The golf balls also typically have at least about 60 percent dimple coverage, preferably at least about 70 percent dimple coverage, of the surface area of the cover.

Typically, the covers are formed around the solid or wound cores by compression molding preformed half-shells of the cover stock material, casting, or injection molding the cover stock about the core, including reaction injection molding and liquid injection molding ("LIM"). Half-shells are made by injection molding a cover stock into a conventional half-shell mold in a conventional manner. The preferred method is compression molding of preformed half-shells.

The cover may include a plurality of layers, e.g., an inner cover layer disposed about a golf ball center and an outer cover layer formed thereon. For example, the present invention encompasses a golf ball having a core, a thin inner cover layer, and a thin outer cover layer disposed thereon.

In another embodiment, the outer cover layer has a different hardness than the inner cover layer. In one embodiment, the inner cover layer has a hardness from about 30 Shore D to about 75 Shore D. In another embodiment, the inner cover layer has a hardness from about 40 Shore D to about 70 Shore D. In yet another embodiment, the inner cover layer has a hardness from about 50 Shore D to about 60 Shore D. In one embodiment, the outer cover layer has a hardness from about 25 Shore D to about 65 Shore D. In another embodiment, the outer cover layer has a hardness from about 40 Shore D to about 60 Shore D. In yet another embodiment, the outer cover layer has a hardness from about 45 Shore D to about 55 Shore D.

In one embodiment, the difference in hardness of the outer cover layer and the inner cover layer is from about 5 Shore D to about 50 Shore D. In another embodiment, the difference in hardness of the outer cover layer and the inner cover layer is from about 10 Shore D to about 30 Shore D. In yet another embodiment, the difference in hardness of the outer cover layer and the inner cover layer is from about 15 Shore D to about 20 Shore D. Depending on the desired performance and field, the hardness of the inner cover layer may be greater than the hardness of the outer cover layer, or the hardness of the inner cover layer may be less than the hardness of the outer cover layer.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

In one such embodiment, both covers layers can be formed of the same material and have essentially the same hardness, but the layers are designed to have different coefficient of friction values. In another embodiment, the compositions of the invention are used in a golf ball with multiple cover layers having essentially the same hardness, but different rheological properties under high deformation. Another aspect of this embodiment relates to a golf ball with multiple cover layers having essentially the same hardness, but different thicknesses to simulate a soft outer cover over hard inner cover ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Methods of Forming Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of injection molding using a split vent pin can be found in co-pending U.S. patent application Ser. No. 09/742,435, filed Dec. 22, 2000, entitled "Split Vent Pin for Injection Molding." Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

Conventionally, compression molding and injection molding are applied to thermoplastic materials, whereas RIM, liquid injection molding, and casting are employed on thermoset materials. These and other manufacture methods are disclosed in U.S. Pat. Nos. 5,334,673, 5,484,870, and 5,733,428, the disclosures of which are incorporated herein by reference in their entirety.

Forming the Core Layer(s)

The cores of the invention may be formed by any suitable method known to one of ordinary skill in art. When the cores are formed from a thermoset material, compression molded is a particularly suitable method of forming the core. In a thermoplastic core embodiment, on the other hand, the cores may be injection molded.

Suitable methods include single pass mixing (ingredients are added sequentially), multi-pass mixing, and the like. The crosslinking agent, and any other optional additives used to modify the characteristics of the golf ball center or additional layer(s), may similarly be combined by any type of mixing. Suitable mixing equipment is well known to one of ordinary skill in the art, and such equipment may include a Banbury mixer, a two-roll mill, or a twin screw extruder. Suitable mixing speeds and temperatures are well-known to one of ordinary skill in the art, or may be readily determined without undue experimentation.

The mixture can be subjected to, e.g., a compression or injection molding process, and the molding cycle may have a single step of molding the mixture at a single temperature for a fixed-time duration. In one embodiment, a single-step cure cycle is employed. Although the curing time depends on the various materials selected, a suitable curing time is about 5 minutes to about 18 minutes, preferably from about 8 minutes to about 15 minutes, and more preferably from about 10 minutes to about 12 minutes. An example of a single step molding cycle, for a mixture that contains dicumyl peroxide, would hold the polymer mixture at 171° C. (340° F.) for a duration of 15 minutes. An example of a two-step molding cycle would be holding the mold at 143° C. (290° F.) for 40 minutes, then ramping the mold to 171° C. (340° F.) where it is held for a duration of 20 minutes. One of ordinary skill in the art will be readily able to adjust the curing time based on the particular materials used and the discussion herein.

Furthermore, U.S. Pat. Nos. 6,180,040 and 6,180,722 disclose methods of preparing dual core golf balls. The entire disclosures of these patents are hereby incorporated by reference herein.

Forming the Intermediate Layer(s)

The intermediate layer may also be formed from using any suitable method known to one of ordinary skill in the art. For example, an intermediate layer may be formed by blow molding and covered with a dimpled cover layer formed by injection molding, compression molding, casting, vacuum forming, powder coating, and the like.

For example, castable reactive liquid materials, such as the reaction products of the invention may be applied over the inner ball using a variety of application techniques such as spraying, compression molding, dipping, spin coating, or flow coating methods that are well known in the art. In one embodiment, the castable reactive reaction product is formed over the core using a combination of casting and compression molding. Conventionally, compression molding and injection molding are applied to thermoplastic cover materials, whereas RIM, liquid injection molding, and casting are utilized on thermoset cover techniques.

Forming the Cover Layer(s)

The compositions of the invention may be applied over an inner ball using a variety of application techniques such as spraying, compression molding, dipping, spin coating, or flow coating methods that are well known in the art. In one embodiment, the compositions of the invention are used to form a cover over the core using a combination of casting and compression molding. Conventionally, compression molding and injection molding are applied to thermoplastic cover materials, whereas RIM, liquid injection molding, and casting are employed on thermoset cover materials.

In addition, when covers for the golf balls of the invention are formed of polyurea and/or polyurethane compositions, these materials may be applied over an inner ball using a variety of application techniques such as spraying, compression molding, dipping, spin coating, casting, or flow coating methods that are well known in the art. Examples of forming polyurea and polyurethane materials about an inner ball are disclosed in U.S. Pat. Nos. 6,207,784, 5,733,428, 5,006,297, and 5,334,673, which are incorporated by reference in their entirety herein. In one embodiment, a combination of casting and compression molding can be used to form a polyurethane or polyurea composition over an inner ball. However, the method of forming covers according to the invention is not limited to the use of these techniques; other methods known to those skilled in the art may also be employed.

Dimples

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281.

In one embodiment of the present invention, the golf ball has an icosahedron dimple pattern that includes 20 triangles made from about 362 dimples and, except perhaps for the mold parting line, does not have a great circle that does not intersect any dimples. Each of the large triangles, preferably, has an odd number of dimples (7) along each side and the small triangles have an even number of dimples (4) along each side. To properly pack the dimples, the large triangle has nine more dimples than the small triangle. In another embodiment, the ball has five different sizes of dimples in total. The sides of the large triangle have four different sizes of dimples and the small triangles have two different sizes of dimples.

In another embodiment of the present invention, the golf ball has an icosahedron dimple pattern with a large triangle including three different dimples and the small triangles having only one diameter of dimple. In a preferred embodiment, there are 392 dimples and one great circle that does not intersect any dimples. In another embodiment, more than five alternative dimple diameters are used.

In one embodiment of the present invention, the golf ball has an octahedron dimple pattern including eight triangles made from about 440 dimples and three great circles that do not intersect any dimples. In the octahedron pattern, the pattern includes a third set of dimples formed in a smallest triangle inside of and adjacent to the small triangle. To properly pack the dimples, the large triangle has nine more dimples than the small triangle and the small triangle has nine more dimples than the smallest triangle. In this embodiment, the ball has six different dimple diameters distributed over the surface of the ball. The large triangle has five different dimple diameters, the small triangle has three different dimple diameters and the smallest triangle has two different dimple diameters.

Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated by reference herein.

The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer.

In an alternative embodiment, the golf ball may have a non-planar parting line allowing for some of the plurality of pyramidal projections to be disposed about the equator. Such a golf ball may be fabricated using a mold as disclosed in co-pending U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections.

Several additional non-limiting examples of dimple patterns with varying sizes of dimples are also provided in U.S. Pat. No. 6,358,161 and U.S. Pat. No. 6,213,898, the entire disclosures of which are incorporated by reference herein.

The total number of dimples on the ball, or dimple count, may vary depending on such factors as the dimple size and the selected pattern. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, is contemplated for use with the golf balls of the present invention.

Golf Ball Post-Processing

The golf balls of the present invention may be painted, coated, or surface treated for further benefits.

For example, golf balls covers frequently contain a fluorescent material and/or a dye or pigment to achieve the desired color characteristics. A golf ball of the invention may also be treated with a base resin paint composition, however, as disclosed in U.S. Patent Publication No. 2002/0082358, which includes a 7-triazinylamino-3-phenylcoumarin derivative as the fluorescent whitening agent to provide improved weather resistance and brightness.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. patent application Ser. No. 10/012,538, filed Dec. 12, 2001, entitled, "Method of Forming Indicia on a Golf Ball," the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, the entirety of which is incorporated by reference herein.

Protective and decorative coating materials, as well as methods of applying such materials to the surface of a golf ball cover, are well known in the golf ball art. Generally, such coating materials include urethanes, urethane hybrids, epoxies, polyesters and acrylics. If desired, more than one coating layer can be used. The coating layer(s) may be applied by any suitable method known to one of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.700 to about 1.950 inches can be used. Preferably, the overall diameter of the core and all intermediate layers is about 80 percent to about 98 percent of the overall diameter of the finished ball.

The core may have a diameter ranging from about 0.090 inches to about 1.650 inches. In one embodiment, the diameter of the core of the present invention is about 1.200 inches to about 1.630 inches. In another embodiment, the diameter of the core is about 1.300 inches to about 1.600 inches, preferably from about 1.390 inches to about 1.600 inches, and more preferably from about 1.500 inches to about 1.600 inches. In yet another embodiment, the core has a diameter of about 1.550 inches to about 1.650 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.540 inches or greater, preferably about 1.550 inches or greater. In one embodiment, the core diameter is about 1.590 inches or greater. In another embodiment, the diameter of the core is about 1.640 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer is between about 0.02 inches to about 0.045 inches. In still another embodiment, the outer cover layer is about 0.025 to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

The molding process and composition of golf ball portions typically results in a gradient of material properties. Methods employed in the prior art generally exploit hardness to quantify these gradients. Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

When a composition of the present invention is incorporated into a core, the core may have a hardness gradient, i.e., a first hardness at a first point, i.e., at an interior location, and a second hardness at a second point, i.e., at an exterior surface, as measured on a molded sphere. In one embodiment, the second hardness is at least about 6 percent greater than the first hardness, preferably about 10 percent greater than the first hardness. In other embodiments, the second hardness is at least about 20 percent greater or at least about 30 percent greater, than the first hardness.

For example, the interior of the core may have a first hardness of about 45 Shore C to about 60 Shore C and the exterior surface of the core may have a second hardness of about 65 Shore C to about 75 Shore C. In one golf ball formulated according to the invention, the first hardness was about 51 Shore C and a second hardness was about 71 Shore C, providing a hardness difference of greater than 20 percent.

In one embodiment, however, the core has a substantially uniform hardness throughout. Thus, in this aspect, the first and second hardness preferably differ by about 5 percent or less, more preferably about 3 percent or less, and even more preferably by about 2 percent or less. In another embodiment, the hardness is uniform throughout the component.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 60 Shore D. In one embodiment, the cover has a hardness of about 40 Shore D to about 65 Shore D. In another embodiment, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D. In yet another embodiment, the cover hardness is from about 35 to 80 Shore D, preferably from about 40 to 75 Shore D, and more preferably from about 45 to 70 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 95 Shore C or less, preferably about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 75 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Depending on the desired properties, balls prepared according to the invention can exhibit substantially the same or higher resilience, or coefficient of restitution (CoR), with a decrease in compression or modulus, compared to balls of conventional construction. As used herein, the term "coefficient of restitution" (CoR) is calculated by dividing the rebound velocity of the golf ball by the incoming velocity when a golf ball is shot out of an air cannon. The CoR testing is conducted over a range of incoming velocities and determined at an inbound velocity of 125 ft/s. Additionally, balls prepared according to the invention can also exhibit substantially higher resilience, or coefficient of restitution (CoR), without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is a golf ball core. The reaction product preferably has a loss tangent below about 0.1 at −50° C., and more preferably below about 0.07 at −50° C.

There is currently no USGA limit on the CoR of a golf ball, but the initial velocity of the golf ball cannot exceed 250±5 feet/second (ft/s). Thus, in one embodiment, the initial velocity is about 245 ft/s or greater and about 255 ft/s or less. In another embodiment, the initial velocity is about 250 ft/s or greater. In one embodiment, the initial velocity is about 250 ft/s to about 255 ft/s. In another embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize CoR without violating the 255 ft/s limit. In a one-piece solid golf ball, the CoR will depend on a variety of characteristics of the ball, including its composition and hardness. For a given composition, CoR will generally increase as hardness is increased. In a two-piece solid golf ball, e.g., a core and a cover, one of the purposes of the cover is to produce a gain in CoR over that of the core. When the contribution of the core to high CoR is substantial, a lesser contribution is required from the cover. Similarly, when the cover contributes substantially to high CoR of the ball, a lesser contribution is needed from the core.

The resultant golf balls typically have a coefficient of restitution of greater than about 0.7, preferably greater than about 0.75, and more preferably greater than about 0.78. In one embodiment, golf balls that have a CoR from about 0.7 to about 0.820. In another embodiment, the ball has a CoR of about 0.780 or greater. In addition, the inner ball preferably has a CoR of about 0.800 or more. In one embodiment, the CoR is about 0.815 or greater.

The golf balls also typically have an Atti compression (which has been referred to as PGA compression in the past) of at least about 40, preferably from about 50 to 120, and more preferably from about 60 to 100. Preferably, golf balls have an Atti compression of 80 or greater, more preferably 90 or greater, most preferably 95 or greater. As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball core. Compression values are dependent on the diameter of the article being measured. The golf ball polybutadiene material of the present invention typically has a flexural modulus of from about 500 psi to 300,000 psi, preferably from about 2000 to 200,000 psi. The golf ball polybutadiene material typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material. The dynamic shear storage modulus, or storage modulus, of the golf ball polybutadiene material at about 23° C. is typically at least about 10,000 dyn/cm$^2$, preferably from about $10^4$-$10^{10}$ dyn/cm$^2$, more preferably from about $10^6$ to $10^{10}$ dyn/cm$^2$.

Compression values are dependent on the diameter of the component being measured. The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25. In yet another embodiment, the core compression is zero or negative compression (i.e., below zero).

In an alternative, low compression embodiment, the core has a compression less than about 20, more preferably less than about 10, and most preferably, 0. As known to one of ordinary skill in the art, however, the cores generated according to the present invention may be below the measurement of the Atti Compression Gauge. In an embodiment where the core is hard, the compression may be about 90 or greater. In one embodiment, the compression of the hard core ranges from about 90 to about 100.

The core of the present invention may also have a Soft Center Deflection Index (SCDI) compression of less than about 160, preferably between about 40 and about 160, and more preferably, between about 60 and about 120.

Flexural Modulus

Accordingly, it is preferable that the golf balls of the present invention have an intermediate layer with a flexural modulus of about 500 psi to about 500,000 psi. More preferably, the flexural modulus of the intermediate layer is about 2,000 psi to about 200,000 psi. Most preferably, the flexural modulus of the intermediate layer is about 2,000 psi to about 200,000 psi. Flexural modulus is a material property that measures the flexural modulus of the material itself, rather than being a measurement of the golf ball or component (i.e., cover, intermediate layer or core). For example, the flexural modulus of a cover, as referred to herein, is a measurement of the flexural modulus of the materials that comprise the cover, rather than the cover itself. Likewise, the flexural modulus of the intermediate layer, as referred to herein, is a measurement of the flexural modulus of the materials that comprise the intermediate layer, rather than the cover itself.

The flexural modulus of the cover on the golf balls, as measured by ASTM method D-790, is typically greater than about 500 psi, and is preferably from about 500 psi to about 150,000 psi. The flexural moduli of the cover layer is preferably about 2,000 psi or greater, and more preferably about 5,000 psi or greater. In one embodiment, the flexural moduli of the cover is from about 5,000 psi to about 100,000 psi, more preferably from about 15,000 psi to about 80,000 psi, and most preferably from about 18,000 psi to about 65,000 psi. In another embodiment, the flexural moduli of the cover layer is about 100,000 psi or less, preferably about 80,000 or less, and more preferably about 70,000 psi or less. In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer including the compositions of the invention is preferably at least about 0.7. The specific gravity of a cover including the compositions of the invention is from about 0.8 to about 1.15, preferably from about 0.9 to about 1.10, and more preferably from about 0.95 to about 1.05. The specific gravity of an intermediate layer including the compositions of the invention is from about 0.9 to about 5.0, preferably from about 0.95 to about 4, and more preferably from about 1.0 to about 3.0.

In another embodiment, the specific gravity of a cover or intermediate layer including the compositions of the invention is at least about 0.6. In yet another embodiment, the specific gravity of the cover or intermediate layer is at last about 1.0, preferably at least about 0.9 and more preferably at least about 0.8.

The specific gravity of a core including the compositions of the invention is greater than 1.5, more preferably greater than 1.8 and more preferably greater than 2.0. In another embodiment, the specific gravity of the fore including the compositions of the invention is greater than 2.5, and can be as high as 5.0 and 10.0.

Ball Spin

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist Pinnacle Gold golf ball that gives a ball speed of about 159 to about 161 miles/hour, a launch angle of about 9.0 degrees to about 10.0 degrees, and a spin rate of about 2900 rpm to about 3100 rpm. Thus in one embodiment, the spin rate of a golf ball hit with a golf club driver under such test conditions is between about 2,000 rpm to about 4,000 rpm. In a preferred embodiment, the spin rate of a golf ball hit with a golf club driver is between about 2,500 rpm to about 3,500 rpm, more preferably between about 2,800 and 3,200 rpm.

For an 8-iron ball spin test, a spin rate of a golf ball struck by a standard 8-iron club was obtained by using test conditions for a Titleist Pro VI golf ball that gives a ball speed of about 114 to about 116 miles/hour, a launch angle of about 18.5 to about 19.5 degrees and a spin rate of about 8100 rpm to about 8300 rpm. Thus in one embodiment, the spin rate of cleanly struck 8-iron shot under such test conditions is between 6,500 rpm and 10,000 rpm. In preferred embodiment, the spin rate of an average, cleanly struck 8-iron shot is between 7,500 rpm and 9,000 rpm, more preferably between about 8,000 rpm and 9,000 rpm.

EXAMPLES

Example 1

Golf Ball Cores Comprising ZnPCTP and ZDMA

Golf ball cores were formed, using methods well known in the art, with compositions that comprised ZDMA and ZnPCTP. In particular, the golf ball cores comprised BUNA® CB-23 polybutadiene (Bayer of Akron Ohio), zinc oxide, AKTIPLAST PP (Rhein Chemie Rheinau GmbH of Germany), PERKADOX® BC (Akzo Noble Polymer Chemicals of Chicago, Ill.), SR-365 ZDMA (Sartomer Company, Inc. of Exton, Pa.) and ZnPCTP (eChinachem of San Francisco, Calif.). The following chart shows core compositions made in accordance to the present invention and their corresponding core compression and CoR at 125 fps. All amounts listed in the chart are in pph.

TABLE 1

| Core Formulations Having ZnPCTP and ZDMA | | | | | | | |
|---|---|---|---|---|---|---|---|
| | 1 | 2 | 3 | 4 | 5 | 6 | 7 |
| BUNA ®CB-23 | 100 | 100 | 100 | 100 | 100 | 100 | 100 |
| Zinc Oxide | 5.0 | 5.0 | 5.0 | 5.0 | 5.0 | 5.0 | 5.0 |
| AKTIPLAST ® PP | 5.0 | 5.0 | 5.0 | 5.0 | 5.0 | 5.0 | 5.0 |
| PERKADOX ® BC | 0.50 | 0.50 | 0.50 | 0.50 | 0.50 | 0.50 | 0.50 |
| SR-365 (ZDMA) | 28.0 | 34.0 | 40.0 | 46.0 | 40.0 | 46.0 | 52.0 |
| ZnPCTP | 0 | 0 | 0 | 0 | 2.35 | 2.35 | 2.35 |
| S'max | 23.57 | 28.76 | 35.91 | 45.87 | 27.57 | 34.53 | 52.31 |
| TC90 (min:sec) | 10:55 | 10:40 | 10:39 | 10:21 | 9:01 | 9:41 | 9:38 |
| Compression | — | 2 | 23 | 46 | 31 | 54 | 87 |
| CoR @ 125 fps | 0.7295 | 0.7370 | 0.7406 | 0.7440 | 0.7810 | 0.7864 | 0.8106 |

In addition, the following table shows comparative core formulations that contain ZDA instead of ZDMA. In particular, the golf ball cores comprised BUNA® CB-23 polybutadiene (Bayer of Akron Ohio), zinc oxide, AKTIPLAST PP (Rhein Chemie Rheinau GmbH of Germany), PERKADOX® BC (Akzo Noble Polymer Chemicals of Chicago, Ill.), SR-705 ZDA (Sartomer Company, Inc. of Exton, Pa.) and ZnPCTP (eChinachem of San Francisco, Calif.).

TABLE 2

Comparative Core Formulations Having ZDA

|  | 8 | 9 | 10 | 11 |
|---|---|---|---|---|
| BUNA ®CB-23 | 100 | 100 | 100 | 100 |
| Zinc Oxide | 5.0 | 5.0 | 5.0 | 5.0 |
| AKTIPLAST ® PP | 5.0 | 5.0 | 5.0 | 5.0 |
| PERKADOX ® BC | 0.50 | 0.50 | 0.50 | 0.50 |
| SR-365 (ZDA) | 25.0 | 30.0 | 30.0 | 35.0 |
| ZnPCTP | 0 | 0 | 2.35 | 2.35 |
| S'max | 65.35 | 88.09 | 50.49 | 68.44 |
| TC90 (min:sec) | 8:46 | 8:00 | 13:11 | 13:24 |
| Compression | 62 | 84 | 60 | 77 |
| CoR @ 125 fps | 0.8106 | 0.8196 | 0.8242 | 0.8275 |

The addition of ZnPCTP gives an unexpected effect in ZDMA-containing compositions when compared with ZDA-containing compositions. Formulations 8 and 9 of Table 2 show that increases in ZDA amounts result in significant increases in core compression, but the addition of ZnPCTP (comparing Formulations 9 and 10) lowers core compression while exhibiting a small increase in CoR @ 125 fps and a large increase in the TC90 time. Formulations 1-4 in Table 1 show that increases in ZDMA amounts result in significant increases in core compression, but the addition of ZnPCTP unexpectedly increases core compression while exhibiting large increases in CoR @ 125 fps and small decreases in TC90 times (Formulations 5-8). Further, the combination of ZDMA and ZnPCTP provides for CoR values that are suitable for golf ball cores.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, the compositions of the present invention may be used in a variety of golf equipment, for example, golf shoes for sole applications, as well as in inserts for golf putters. Such modifications are also intended to fall within the scope of the appended claims.

I claim:

1. A golf ball comprising:
   a center;
   an outer core layer disposed about the center comprising:
      a resilient polymer component;
      a free radical source;
      zinc dimethacrylate;
      a co-crosslinking agent comprising an organic acid comprising more than one carboxylic acid group;
      an organosulfur compound or a metal salt of an organosulfur compound present in an amount of about 2 pph to about 5 pph having the following general formula I:

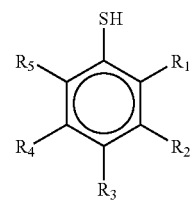

wherein $R_1$-$R_5$ is selected from the group consisting of substituted or unsubstituted $C_1$-$C_8$ alkyl groups; halogen groups; thiol groups (—SH), carboxylated groups; sulfonated groups; and hydrogen; in any order;
   an inner cover layer disposed about the outer core layer; and
   an outer cover layer disposed about the inner cover layer.

2. The golf ball of claim 1, wherein the center has a hardness of about 30 Shore D to about 65 Shore D.

3. The golf ball of claim 1, wherein the co-crosslinking agent is present in an amount of about 20 to about 40 pph.

4. The golf ball of claim 1, wherein the organosulfur compound is present in an amount of about 2 pph to about 3 pph.

5. The golf ball of claim 1, wherein the organosulfur compound is selected from the group consisting of pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; and their metal salts.

6. The golf ball of claim 5, wherein the organosulfur compound is a metal salt of Zn, Ca, Ba, Cd, Sn, Mg, or Mn.

7. The golf ball of claim 6, wherein the organosulfur compound is a metal salt of Zn.

8. The golf ball of claim 7, wherein the organosulfur compound is zinc pentachlorothiophenol.

9. The golf ball of claim 1, wherein the outer cover comprises one or more homopolymeric or copolymeric cover materials selected from the group consisting of thermoset polyurethane, thermoplastic polyurethane, thermoset polyurea, thermoplastic polyurea, thermoset elastomer, thermoplastic elastomer and thermoplastic ionomer.

10. The golf ball of claim 3, wherein the co-crosslinking agent is present in an amount of about 25 to about 35 pph.

11. A golf ball comprising a core, an intermediate layer, an inner cover layer, and an outer cover layer, wherein at least one layer formed from a composition that comprises a resilient polymer component, a free radical source, zinc dimethacrylate present in an amount of about 15 pph to about 25 pph, and zinc pentachlorothiophenol present in an amount of about 2 pph to about 5 pph; and a co-crosslinking agent present in an amount of about 25 pph to about 35 pph.

12. The golf ball of claim 11, wherein the outer cover layer comprises one or more homopolymeric or copolymeric cover materials selected from the group consisting of thermoset polyurethane, thermoplastic polyurethane, thermoset polyurea, thermoplastic polyurea, thermoset elastomer, thermoplastic elastomer and thermoplastic ionomer.

13. The golf ball of claim 11, wherein the core has a hardness of about 30 Shore D to about 65 Shore D.

14. A golf ball comprising:
a center;
an outer core layer disposed about the center comprising:
   a resilient polymer component;
   a free radical source;
   zinc dimethacrylate present in an amount of about 15 pph to about 25 pph;
   a co-crosslinking agent present in an amount of about 25 pph to about 35 pph;
   an organosulfur compound or a metal salt of an organosulfur compound present in an amount of about 2 pph to about 5 pph having the following general formula I:

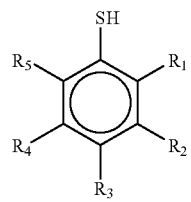

wherein $R_1$-$R_5$ is selected from the group consisting of substituted or unsubstituted $C_1$-$C_8$ alkyl groups; halogen groups; thiol groups (—SH), carboxylated groups; sulfonated groups; and hydrogen; in any order;

an inner cover layer disposed about the outer core layer; and an outer cover layer disposed about the inner cover layer.

15. The golf ball of claim 14, wherein the organosulfur compound is a metal salt of Zn, Ca, Ba, Cd, Sn, Mg, or Mn.

16. The golf ball of claim 14, wherein the organosulfur compound is selected from the group consisting of pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol; and their metal salts.

17. The golf ball of claim 14, wherein the inner cover layer comprises a thermoplastic material and the outer cover layer comprises a castable reactive liquid material.

* * * * *